United States Patent [19]

Walrath et al.

[11] Patent Number: 5,454,082
[45] Date of Patent: Sep. 26, 1995

[54] SYSTEM FOR PREVENTING AN UNSELECTED CONTROLLER FROM TRANSFERRING DATA VIA A FIRST BUS WHILE CONCURRENTLY PERMITTING IT TO TRANSFER DATA VIA A SECOND BUS

[75] Inventors: Craig A. Walrath, Easley; Jimmy D. Pike, Greenville; Gene F. Young, Lexington, all of S.C.

[73] Assignee: NCR Corporation, Dayton, Ohio

[21] Appl. No.: 175,157

[22] Filed: Nov. 12, 1992

Related U.S. Application Data

[63] Continuation of Ser. No. 761,580, Sep. 18, 1991, abandoned.

[51] Int. Cl.⁶ .................................................. G06F 13/36
[52] U.S. Cl. ...................... 395/288; 395/405; 395/494; 364/DIG. 1; 364/240.2; 364/242.92; 364/246.6
[58] Field of Search ........................ 370/85.9; 395/200, 395/325, 425, 725, 800

[56] References Cited

U.S. PATENT DOCUMENTS

| | | | |
|---|---|---|---|
| 4,228,496 | 10/1980 | Katzman et al. | 364/200 |
| 4,410,944 | 10/1983 | Kronies | 395/425 |
| 4,413,315 | 11/1983 | Kuranane | 395/325 |
| 4,445,174 | 4/1984 | Fletcher | 395/425 |
| 4,604,683 | 8/1986 | Russ et al. | 395/325 |
| 4,646,237 | 2/1987 | Allen | 395/425 |
| 4,748,560 | 5/1988 | Kataoka | 395/325 |
| 4,785,394 | 11/1988 | Fischer | 395/325 |
| 4,785,396 | 11/1988 | Murphy et al. | 395/325 |
| 4,837,682 | 6/1989 | Culler | 395/325 |
| 4,937,733 | 6/1990 | Gillett, Jr. et al. | 395/325 |
| 4,947,368 | 8/1989 | Donaldson et al. | 395/325 |
| 4,980,854 | 12/1990 | Donaldson et al. | 395/325 |
| 4,982,322 | 1/1991 | Eggers et al. | 395/325 |
| 5,025,365 | 6/1991 | Mathur et al. | 395/600 |
| 5,034,883 | 7/1991 | Donaldson et al. | 395/325 |
| 5,111,424 | 5/1992 | Donaldson et al. | 385/725 |
| 5,195,185 | 3/1993 | Marenin | 395/325 |
| 5,235,685 | 8/1993 | Caldara et al. | 395/325 |
| 5,237,686 | 8/1993 | Asano et al. | 395/650 |

*Primary Examiner*—Thomas C. Lee
*Assistant Examiner*—Lance Leonard Barry
*Attorney, Agent, or Firm*—Douglas S. Foote; James M. Stover

[57] ABSTRACT

An interleave lock arrangement for a computer system ensures the atomicity of a data transfer operation over a selected bus between a selected intelligent controller and a selected memory interleave, without interfering with data transfers over unselected buses between unselected intelligent controllers and unselected memory interleaves. An interleave lock signal issued by the selected intelligent controller over the selected bus is detected by and prevents only unselected intelligent controllers on the selected bus from executing bus cycles while the interleave lock signal is being asserted.

3 Claims, 6 Drawing Sheets

SYSTEM FOR PREVENTING AN UNSELECTED CONTROLLER FROM TRANSFERRING DATA VIA A FIRST BUS WHILE CONCURRENTLY PERMITTING IT TO TRANSFER DATA VIA A SECOND BUS

This is a continuation of application Ser. No. 761,580 filed on Sep. 18, 1991 now abandoned.

BACKGROUND OF THE INVENTION

1. Field of the Invention

The present invention relates to methods and systems for ensuring the atomicity of an atomic data transfer over one or more system buses of a computer system. In particular, the present invention relates to methods and systems for ensuring the atomicity of an atomic data transfer over a first system bus of a dual bus computer system which has two or more central processing units (CPUs), without interfering with bus activity on the second system bus.

2. Description of Related Technology

The use of semaphores in a computer system requires the atomic execution of a sequence of instructions, that is, execution as single, uninterruptible operations. An example of an atomic operation is a read-modify-write operation.

In a computer system having two or more CPUs, the atomicity of an atomic data transfer from a CPU to a memory interleave must be ensured to protect the integrity of transferred data and thus ensure proper operation of the overall computer system. The prior art solution to this problem was, and is, to lock all the system buses, thereby preventing all bus activity other than the atomic data transfer, for the duration of the atomic data transfer. This solution degrades performance by effectively transforming the multiprocessor system into a uniprocessor system for the duration of the atomic data transfer.

SUMMARY OF THE INVENTION

Our invention is embodied in a computer system and a method of operating a computer system for effecting atomic data transfers over a bus between a memory interleave and an intelligent controller, without interference from other intelligent controllers on the bus.

Our invention is also embodied in a computer system and a method of operating a computer system for effecting atomic data transfers over a selected bus between a memory interleave and an intelligent controller, without interference from other intelligent controllers on the selected bus or on unselected buses, and without preventing intelligent controllers on the unselected buses from executing bus cycles over the unselected buses.

In one specific aspect, our invention is embodied in a computer system for effecting atomic data transfer over a system bus between a selected intelligent controller and a selected memory interleave without interference from other intelligent controllers on the bus, which comprises: at least one system bus; at least two intelligent controllers in communication with the bus for selectively asserting an interleave lock signal over the bus addressed to a selected memory interleave to initiate an atomic data transfer between the selected memory interleave and the selected intelligent controller which is asserting the interleave lock signal; and at least two memory interleaves in communication with the bus for detecting the interleave lock signal addressed to a selected one of the memory interleaves to prevent only the selected memory interleave from being driven by unselected intelligent controllers.

In another aspect, our invention is embodied in a computer system for effecting atomic data transfer over a system bus between a selected intelligent controller and a selected memory interleave without interfering with data transfer over other system buses, which comprises: at least two system buses; at least two intelligent controllers in communication with the individual buses for selectively asserting an interleave lock signal over one of the buses addressed to a selected memory interleave to initiate an atomic data transfer between the selected memory interleave and the selected intelligent controller asserting the interleave lock signal, and to set the other, unselected intelligent controllers on only the said one bus to prevent them from driving bus cycles, so that the unselected intelligent controllers on other buses are not prevented from driving bus cycles; and at least two memory interleaves electrically connected to the system buses for detecting the interleave lock signal addressed to a selected one of the memory interleaves to prevent only the selected memory interleave from being driven by unselected intelligent controllers.

In another, method aspect, our invention is embodied in a method of effecting atomic transfer of data in a computer system having at least a pair of intelligent controllers and at least a pair of memory interleaves on a system bus. The method comprises: asserting an interleave lock signal from a selected intelligent controller addressed to a selected memory interleave to set the selected memory interleave for being driven by only the selected intelligent controller while the interleave lock signal is being asserted, without setting unselected memory interleaves; and transferring data over the bus between the selected intelligent controller and the selected memory interleave, whereby the data is transferred atomically without preventing the unselected intelligent controllers from driving other memory interleaves.

In yet another non-exhaustive aspect, our invention is embodied in a method of effecting atomic transfer of data in a computer system having at least two system buses, two memory interleaves in communication with the buses, and two intelligent controllers in communication with the individual buses and comprises: asserting an interleave lock signal over a selected bus from a selected intelligent controller to set unselected intelligent controllers on the selected bus to prevent said unselected intelligent controllers from executing bus cycles while the interleave lock signal is being asserted, and to set a selected memory interleave for being driven by only the selected intelligent controller while the interleave lock signal is being asserted, without setting unselected memory interleaves; and transferring data over the selected bus between the selected memory interleave and the selected intelligent controller, so that the data is transferred atomically without preventing intelligent controllers on unselected buses from executing bus cycles to unselected memory interleaves.

BRIEF DESCRIPTION OF THE DRAWINGS

The above and other aspects of our present invention are described with respect to the drawings, in which.

DETAILED DESCRIPTION OF THE PREFERRED EMBODIMENTS

Overall Dual Bus Computer System

Figure 1:
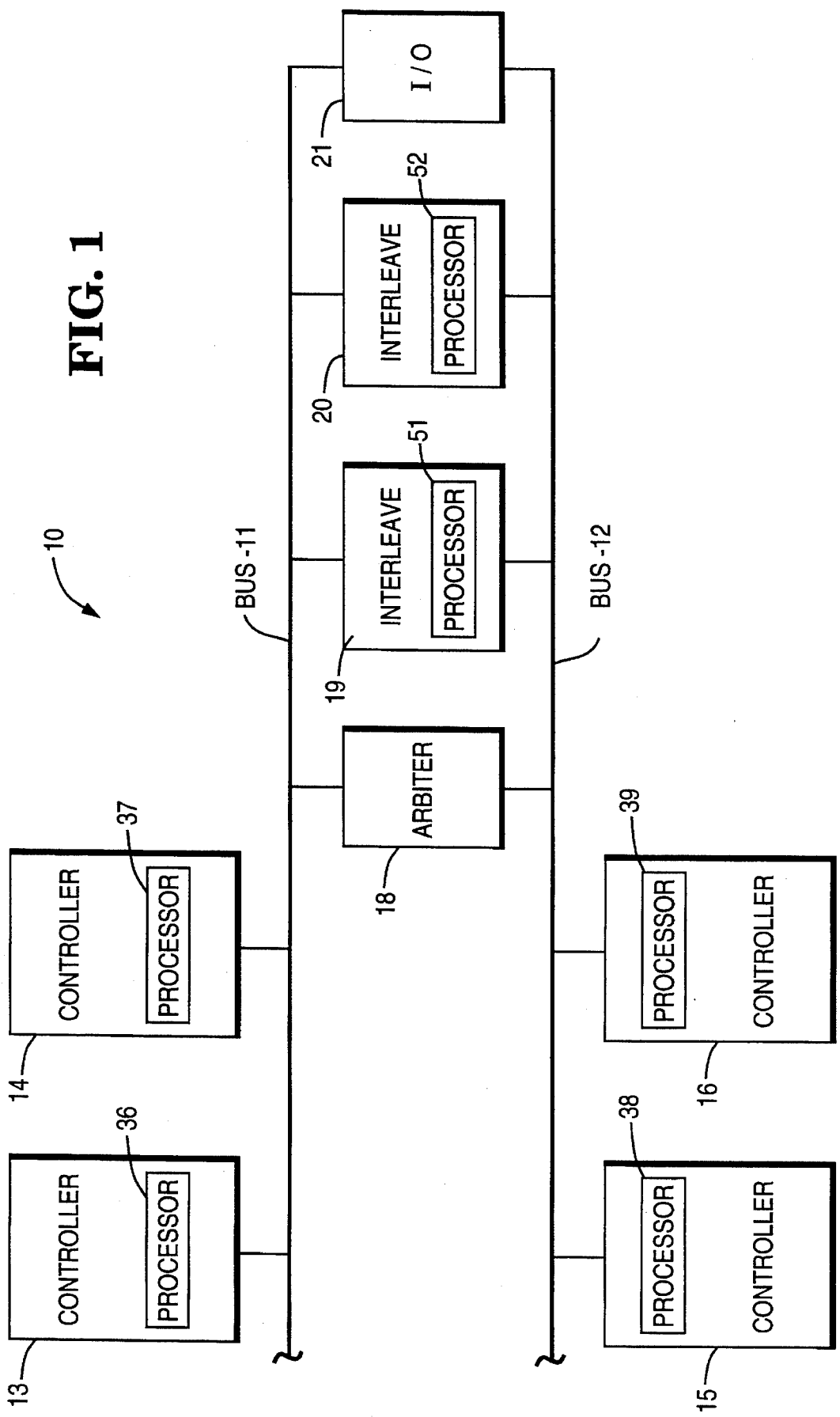
FIG. 1 is a block diagram of the relevant portions of a dual bus computer system incorporating an interleave lock which embodies our present invention.

Referring to FIG. 1, there is shown in relevant part a dual bus computer system, designated generally by the reference numeral 10, which utilizes an interleave lock in accordance with our present invention. The system 10 includes system buses 11 and 12 which carry signals among intelligent controllers 13 through 16, arbiter 18, memory interleaves 19 and 20, input device and/or output (I/O) device 21, and other I/O devices (not shown).

Referring further to FIG. 1, in the preferred embodiment, each of the intelligent controllers 13 through 16 includes one central processing unit (CPU) 36 through 39, respectively. The CPU can be an 80486, or any of various other processors. In other embodiments, the controller may include data sending and/or receiving devices (for brevity, also called "data sending or receiving devices" or simply "devices") such as input devices and output devices.

In the preferred embodiment of the interleave lock, the integrity of an atomic data transfer over a system bus (for example over system bus 11 between the CPU 36 of intelligent controller 13 and memory interleave 19) is maintained by preventing the other CPUs 37 of controllers such as 14 on the same system bus 11 from executing bus cycles during the selected atomic data transfer. In the exemplary embodiment illustrated in FIG. 1, CPUs 38 and 39 of the controllers 15 and 16 on the other, non-selected system bus 12 are not prevented from executing cycles over bus 12 so long as these CPUs 38 and 39 do not attempt to execute cycles to the memory interleave which is being accessed during the atomic data transfer.

System Buses

Each system bus 11 and 12 of the dual bus system of FIG. 1 is comprised of a clock line, at least two request lines, at least two acknowledge lines, a bus busy line, an address line, at least one data line, at least one operation line, an interleave lock line, a global lock line, a retry line, a burst ready line, and a burst last line. The bus can additionally contain one or more cache lines for transferring data to and from caches.

A pulsed signal, transmitted over the clock line, is used as a timing mechanism for the transmission of signals by the devices communicating over each system bus 11 and 12.

Each system bus 11 and 12 has one request line for each device which is capable of executing a cycle over the bus. When a device such as CPU 36 of intelligent controller 13 wishes to execute bus cycles over system bus 11, CPU 36 transmits a request signal over the request line to the bus arbiter 18. The bus arbiter 18 determines which one of the CPUs 36, 37, 38, and 39 obtains bus ownership at any specific clock cycle.

Each system bus 11 and 12 has one acknowledge line for each device capable of sending a request signal. After a device such as one of the CPUs 36, 37, 38, or 39 transmits a request signal to the bus arbiter 18, the bus arbiter evaluates at least the bus busy line and the global lock line. If the bus busy signal and the global lock signal are not being asserted, the bus arbiter 18 sends an acknowledge signal over one of the acknowledge lines to the CPU 36, 37, 38, or 39 transmitting the request signal, thereby granting one of the CPUs bus ownership.

The intelligent controller 13, 14, 15, or 16, of the CPU 36, 37, 38, or 39 which obtains bus ownership evaluates at least the bus busy line and the interleave lock line. If neither an interleave lock signal nor a bus busy signal is being asserted (that is, if the system bus is not busy and not interleave locked), the CPU 36, 37, 38, or 39 which owns the bus 11 or 12 initiates a data transfer operation by transmitting an address signal over the address line, and an operation signal over the operation line. The address signal contains the location of the data to be transferred. The operation signal contains the type of operation the data is to undergo (e.g. read or write).

If the data transfer operation is atomic and the intelligent controller 13, 14, 15, or 16 of the CPU 36, 37, 38, or 39 which has bus ownership implements the interleave lock to maintain the integrity of the data transfer, then in addition to the address and operation signals, the intelligent controller asserts an interleave lock signal over the interleave lock line. If another CPU 36, 37, 38, or 39 on the system bus 11 or 12 over which the atomic data transfer is occurring is granted bus ownership during the atomic data transfer, that CPU will not execute bus cycles as long as the interleave lock signal is being asserted.

The bus arbiter 18 detects the transmission of the address signal and asserts the bus busy signal over the bus busy line which prevents the other CPU on the bus over which the atomic data transfer is occurring from obtaining bus ownership and executing bus cycles during the assertion of the bus busy signal.

The memory interleave 19 or 20 which contains the requested address detects the address signal and, if the data transfer is a read operation, the memory interleave responds by sending a burst ready signal over the burst ready line and begins to transmit read-data over the data line. If the interleave lock signal is being asserted, the memory interleave 19 or 20 containing the requested address prevents CPUs (36 and 37, or 38 and 39) on the system bus 11 or 12 not utilized for the atomic data transfer from writing to or reading from the memory interleave 19 or 20 containing the requested address while the interleave lock signal is being asserted (discussed below). When the last word of read data is ready to be transferred, the CPU 36, 37, 38, or 39 initiating the atomic data transfer generates and transmits a burst last signal across the burst last line to inform the memory interleave 19 or 20 transmitting read data to discontinue transmitting data.

If the data transfer is a write operation, the CPU begins to transmit write data over the data line. As the last word of write data is being transferred, the CPU transmitting the write data transmits a burst last signal across the burst last line informing the memory interleave 19 or 20 receiving the write data that the following word is the final word to be transmitted.

If the data transfer is atomic, the CPU 36, 37, 38, or 39 which initiated the first data transfer generates and transmits additional address and operation signals, and the memory interleave 19 or 20 continues to accept and transmit data until the final word of the transfer operation is transmitted. The intelligent controller of the CPU which initiated the atomic data transfer discontinues the assertion of the interleave lock signal either after the final word of data has been transmitted (all types of CPUs) or after the address signal corresponding to the final data has been transmitted (e.g. 80486 CPU). At this point, the CPU 36, 37, 38, or 39 which was prevented by the interleave lock from executing bus cycles can execute bus cycles if given an acknowledgment signal by the bus arbiter 18.

The memory interleaves 19 and 20 each contain conventional means 51 and 52 such as processors or CPUs for controlling access to the memory interleave. During an atomic data transfer between one of the CPUs 36, 37, 38, or 39 and one of the memory interleaves 19 or 20 across one of the system buses 11 or 12, in response to the interleave lock signal the processor 51 or 52 of the memory interleave being accessed prevents accesses from CPUs of the other system bus by generating and transmitting (in response to a memory access request from CPUs on the other system bus) either a retry signal instructing the controller to retry the access at a later clock cycle, or a wait signal instructing the controller not to drive clock cycles while the wait signal is being asserted. The retry signal is sent over the retry line of bus system bus 11 and 12. The wait signal is sent over the burst ready line of system bus 11 and 12.

To control the execution of bus cycles when CPUs 36, 37, 38, and 39 are given bus ownership by the bus arbiter 18, each intelligent controller 13, 14, 15, and 16 determines if signals are being asserted on the bus busy line and/or the interleave lock line. If a signal is being asserted on either or both of the bus busy line and interleave lock line, the intelligent controller prevents the CPU which has bus ownership (and is not presently executing a bus cycle) from executing bus cycles. If signals are not being asserted over both the bus busy line and the interleave lock line, then the CPU 36, 37, 38, and 39, once given an acknowledge signal from the bus arbiter 18, can commence executing bus cycles.

The intelligent controllers 37, 37, 38, and 39 can also be adapted by one of skill in the art to determine if signals are being asserted on any of the other bus lines (e.g. burst last line) to determine the clock cycle at which the CPUs 36, 37, 38, and 39 could execute bus cycles.

Example, Read-Write-Modify Data Transfer

Figure 2:
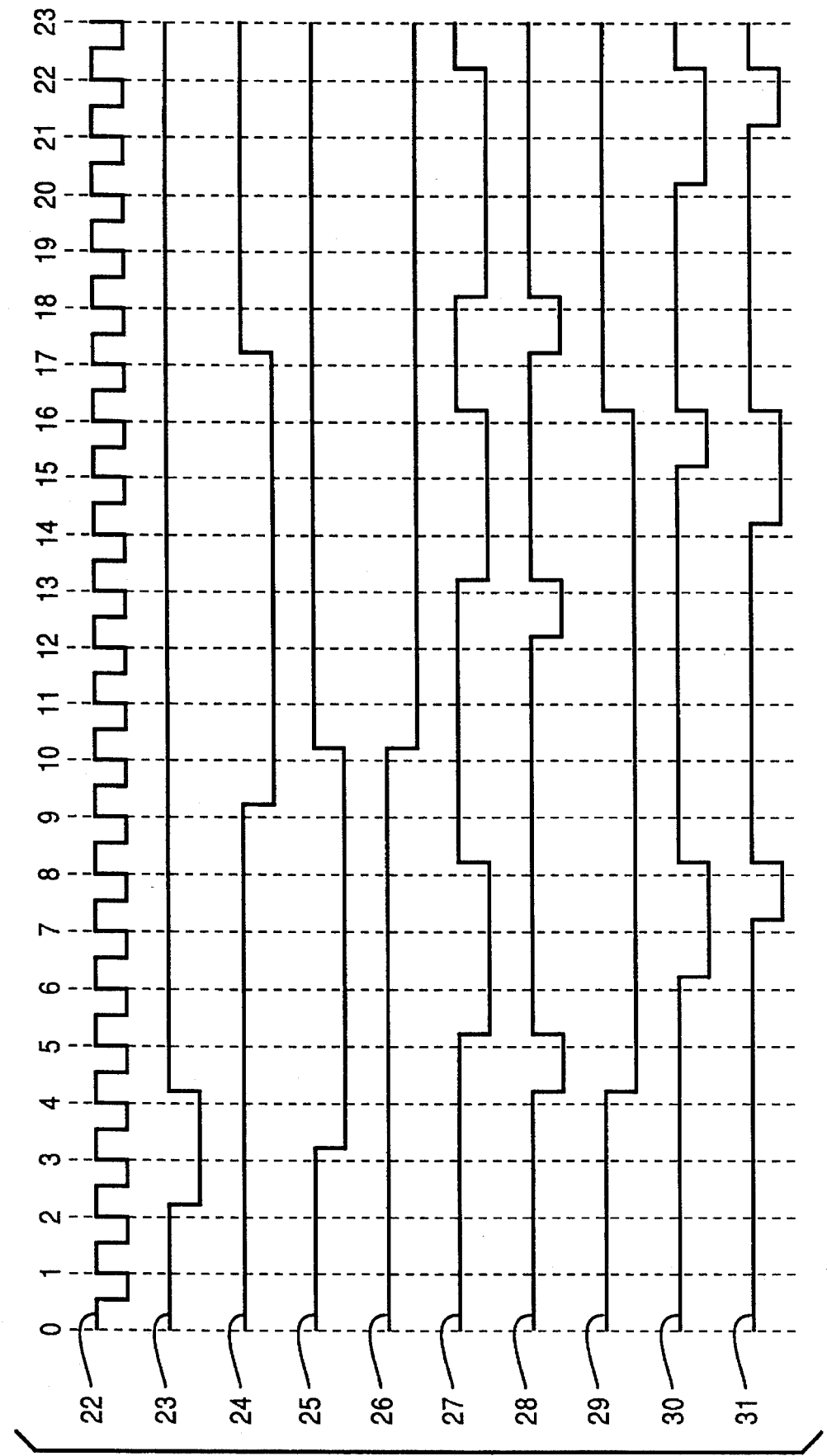
FIG. 2 is a signal diagram demonstrating the operation of the interleave lock system of FIG. 1.

FIG. 2 depicts one example of a read-modify-write atomic data transfer between CPU 36 and memory interleave 19 followed by a nonatomic transfer between CPU 37 and memory interleave 19 over system bus 11 using the preferred embodiment of the interleave lock. For clarity of description, only the bus signals which are necessary to illustrate this example are shown in FIG. 2. The numbered vertical lines represent consecutive clock cycles. In the following description, the clock cycle number is indicated parenthetically.

At the first clock cycle (1), there is no bus activity. CPU 36, which is initiating an atomic data transfer, transmits a request signal 23 over one of the request lines to the bus arbiter 18 (2). The bus arbiter 18 detects the request, determines by monitoring the bus busy line and global lock line that the bus is not busy (no signals are being asserted over the bus busy and global lock lines), and sends an acknowledge signal 25 over one of the acknowledge lines, thus granting bus ownership to CPU 36 (3).

In response to the acknowledgement signal received at CPU 36, intelligent controller 13 determines that no bus busy signal 27 and no interleave lock signal 29 is being transmitted, and transmits both an address signal 28 representing the location of the words of the atomic data transfer, and an operation signal (not shown) representing that the initial operation is a read operation (4).

In response to the address signal 28, the bus arbiter 18 transmits a bus busy signal 27 over the bus busy line (5). Memory interleave 19, which contains the data corresponding to the address signal, detects the address signal 28 and responds by asserting a burst ready signal 30 over the burst ready line (6) and transmits the first word of data. CPU 36 accepts the first word of data and transmits a burst last signal 31 over the burst last line to the memory interleave 19 instructing the memory interleave 19 to discontinue the transmission of data after the second word is transmitted (7). In response to the burst last signal 31, the memory interleave 19 transmits the second word of data and terminates the transmission of the burst ready signal 30 (8). The bus arbiter 18 discontinues the transmission of the bus busy signal 27 (8).

CPU 37 requests bus ownership by asserting a request signal 24 over one of the request lines 24. The bus arbiter 18 determines that the bus 11 is not busy and not globally locked, and transmits an acknowledge signal 26, granting bus ownership to CPU 37 (10). Intelligent controller 14 determines that, although the bus busy signal 27 is not being asserted, the interleave lock signal 29 is being asserted and thus does not permit CPU 37 to execute bus cycles (11).

The CPU 36, having accepted the read data, modifies the read data and, transmits address signal 28 over the address line indicating the memory location to which it is to write the modified data (12). The bus arbiter 18 responds to the address transmission by asserting the bus busy signal 27 (13). CPU 36 drives the first word of write data over one of the data lines (not shown), and memory interleave 19 asserts the burst ready signal 30 over the burst ready line (14). CPU 36 asserts the burst last signal 31 to complete the transfer (15).

At the sixteenth clock cycle, after the last word of write data is transferred, the CPU 36 discontinues the transmission of the burst last signal 31. Because the write operation was the final operation of the atomic data transfer, intelligent controller 13 discontinues the transmission of the interleave lock signal 29 and the bus arbiter 18 discontinues the transmission of the bus busy signal 27.

At this point, the bus busy signal 27 and interleave lock signal 29 are no longer being asserted, and, as a consequence, intelligent controller 14 permits CPU 37 to execute bus cycles. CPU 37 initiates a nonatomic read operation by transmitting an address signal 28 over the address line (17). In response to the address signal 28, the bus arbiter 18 asserts bus busy signal 27 (18).

The memory interleave 19 containing the data corresponding to the address signal 28 transmitted by CPU 37 responds to the address signal by transmitting a burst ready signal 30 (20) and transfers the first word of read data over the data line. CPU 37 accepts the first word of read data and asserts a burst last signal 31 informing the memory interleave 19 that the second word of read data is the last word to be read (21). The last word of data is transmitted by memory interleave 19 which discontinues the transmission of the burst ready signal 30 (22). In response to this completion of the read data transfer operation, the bus arbiter terminates the assertion of the bus busy signal 27 (22).

Second Example, Read-Modify-Write Data Transfer

Figure 3:
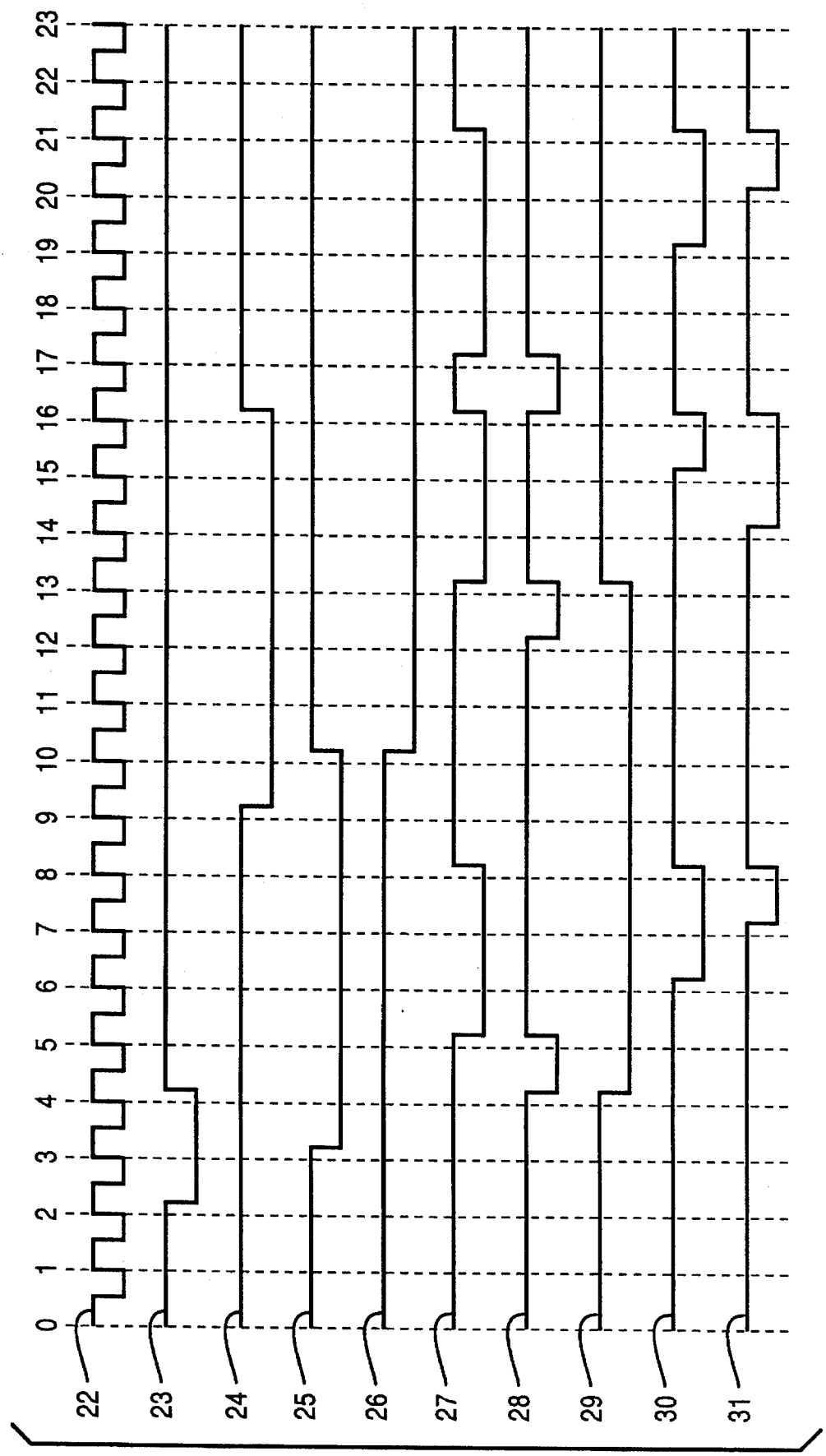
FIG. 3 is another signal diagram demonstrating the operation of the interleave lock system of FIG. 1.

FIG. 3 shows another example of a read-modify-write atomic data transfer between CPU 36 and memory interleave 19 followed by a nonatomic transfer over system bus 11. In this example, the CPU is an 80486 CPU.

This example is nearly identical to the previously described example with the exception that the assertion of the interleave lock signal 29 is discontinued at the thirteenth clock cycle, one clock cycle after the transmission of the final address signal 28 of the atomic data transfer. The atomicity of the data transfer between the CPU 36 and the memory interleave 19 is ensured by discontinuing the transmission of the interleave lock signal 29 at any clock cycle after the final address signal 28 is transmitted.

Signal Contention Rule

In the situation in which there are two back to back interleave-locked atomic data transfers of the same operation type, the intelligent controllers 13, 14, 15, and 16 prevent the CPUs 36, 37, 38, and 39 by way of a signal contention algorithm from driving the interleave lock signal 29 low at the clock cycle following the first atomic data transfer. The CPUs 36, 37, 38, and 39 wait one clock cycle following the discontinuing of the assertion of the first interleave lock signal 29 before the CPUs assert a second interleave lock signal.

This signal contention rule preserves the arbitration function performed by the bus arbiter 18.

Single Bus Computer System

Figure 4:
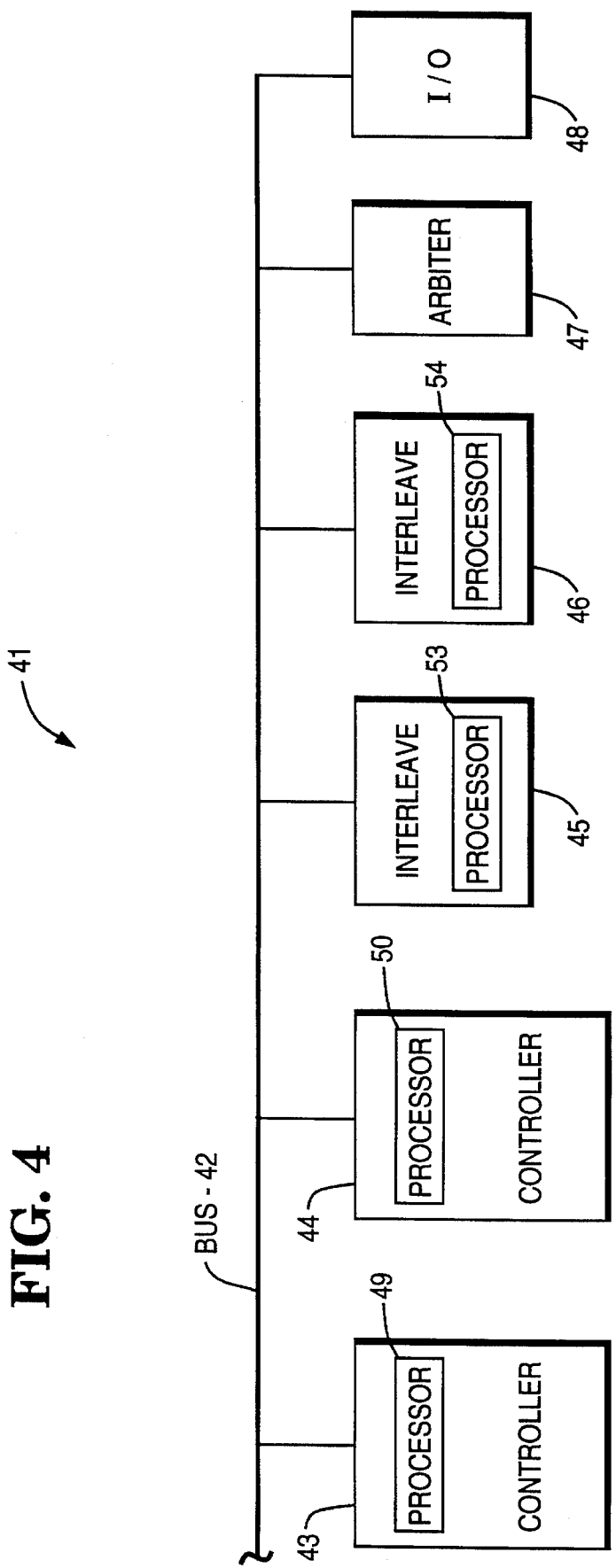
FIG. 4 is a block diagram of the relevant sections of a single bus computer system incorporating the interleave lock of our present invention.
Figure 5:
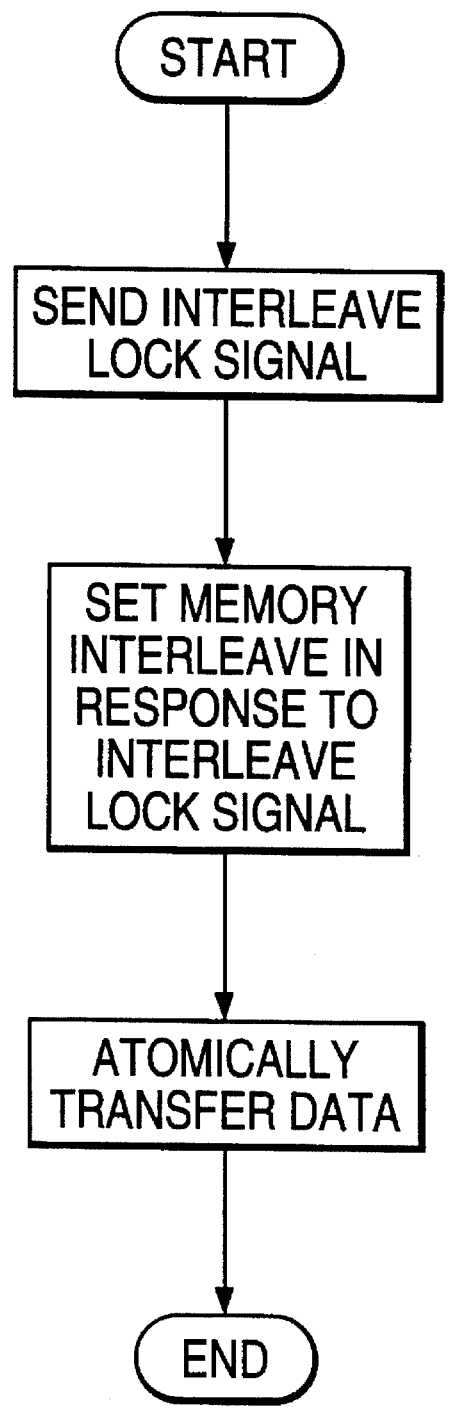
FIG. 5 is a flow chart depicting an exemplary sequence of steps of a method for effecting atomic data transfer in accordance with one embodiment of our present invention.
Figure 6:
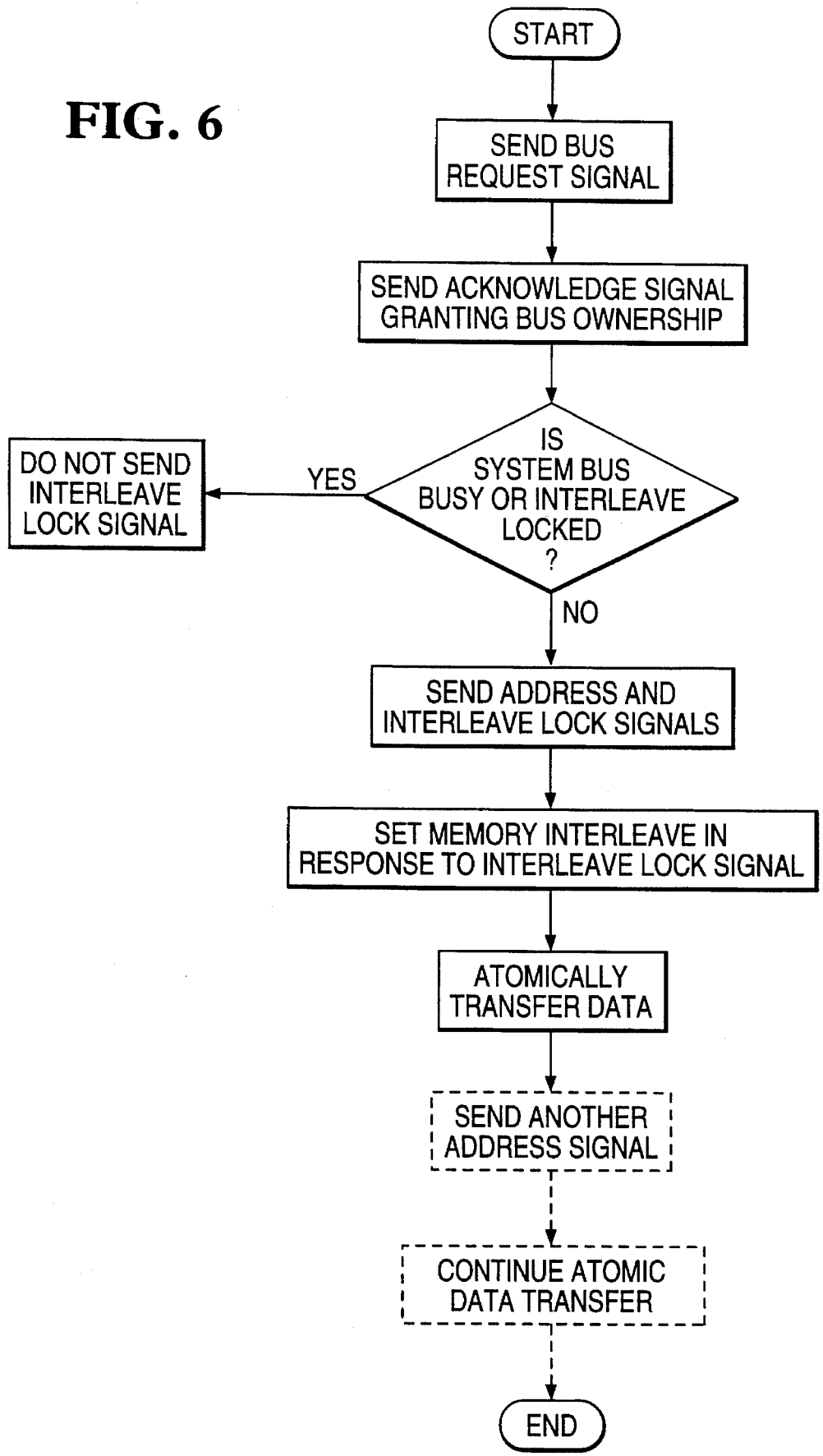
FIG. 6 is a flow chart which depicts another exemplary sequence of steps for effecting atomic data transfer in accordance with another embodiment of our present invention.

FIG. 4 is a block diagram showing, in relevant part, a single system bus computer system 41 utilizing the interleave lock of the present invention. The computer system includes system bus 42, intelligent controllers 43 and 44 each having one CPU 49 and 50, memory interleaves 45 and 46 each having standard processors 53 and 54, CPUs, or other conventional means for controlling access to the memory interleaves, bus arbiter 47, I/O device 48, and other I/O devices (not shown).

In one embodiment of the single bus system, the system bus 42 has the same bus lines as each one of the dual system's buses 11 and 12 (see FIG. 3). If the system bus 42 is a tenured bus, the interleave lock is implemented in the same fashion as in the dual bus system 10. That is, when the interleave lock signal 29 is asserted, the CPU 49 or 50 which is not asserting the interleave lock signal 29 cannot execute bus cycles over the system bus 42.

If the system bus of the single bus computer system is a disconnect bus (also known as a split-transaction bus), the interleave lock can be implemented to allow one CPU such as 49 to execute cycles over the system bus 42 while the other CPU 50 is executing an interleave locked atomic data transfer. In this implementation, the memory interleave such as 45 participating in that atomic data transfer is set, thereby preventing the CPU 50 (which is not initiating the atomic data transfer) from executing cycles over memory interleave 45, and signals CPU 50 to either wait during the assertion of a wait signal or to retry driving bus cycles at a later clock cycle. In this implementation, the intelligent controllers 43 and 44 are not required to evaluate the interleave lock signal 29 to determine if the CPUs 49 and 50 can execute bus cycles. This embodiment can easily be incorporated in the dual bus system if one or both of the system buses are disconnect buses.

In view of the preferred and alternative embodiments of our present invention described here, those of usual skill in the art will readily derive modifications and embodiments that are within the scope of the present invention as defined by the appended claims. For example, one of usual skill in the art will readily incorporate the interleave lock described above into single and multibus computer systems having two or more intelligent controllers and two or more memory interleaves.

We claim:

1. A method of atomically transferring data in a computer system having at least first and second system buses, at least first and second memory interleaves each of said memory interleaves being connected to each of the buses for communication therewith, at least first and second intelligent controllers, the first intelligent controller being connected to the first system bus for communication therewith, and the second intelligent controller being connected to the second system bus for communication therewith, and a bus arbiter connected to said first system bus; the method comprising the steps of:

said first intelligent controller requesting and gaining control of said first system bus from said arbiter;

sending an interleave lock signal over the first system bus from the first intelligent controller to the memory interleaves, said memory interleaves being responsive to said interleave lock signal to prevent any other intelligent controllers on the first system bus from executing bus cycles with the memory interleaves while the interleave lock cycle is being transmitted, and to set a first of the memory interleaves for being driven by only the first intelligent controller while the interleave lock signal is being transmitted; and transferring address information and data over the first system bus between the first memory interleave and the first intelligent controller; and whereby the data are transferred atomically while allowing the second intelligent controller on the second system bus to execute bus cycles to the second memory interleaves executing bus cycles from said second intelligent controller on said second system bus to said second memory interleave during the transfer of address information and data over the first system bus between the first memory interleave and the first intelligent controller.

2. A method of operating a computer system comprising at least first and second system buses, a bus arbiter connected to said first system bus, at least first and second memory interleaves each thereof connected to each of the buses, and at least first and second intelligent controllers, the first intelligent controller connected to the first system bus and the second intelligent controller connected to the second system bus, and the first and second intelligent controllers including respectively first and second central processing units operative to execute cycles over the buses, the method comprising the steps of;

sending a signal from the first central processing unit on the first system bus to the bus arbiter, the signal requesting ownership of the first system bus;

sending an acknowledge signal over the first system bus from the bus arbiter to the first central processing unit granting bus ownership to the first central processing unit;

sending an address signal containing the address in the first memory interleave of the data to be transferred and an interleave lock signal over the first system bus from the first intelligent controller to the memory interleaves to set the memory interleaves to prevent any other intelligent controllers on the first system bus from executing bus cycles on the first system bus with the memory interleaves while the interleave lock signal is being transmitted;

in response to the address signal, initiating atomic data transfer over the first system bus between the first memory interleave and the first central processing unit; and executing bus cycles from said second controller over said second system bus during the atomic data transfer over the first system bus between the first memory interleave and the first central processing unit.

3. A computer system for atomically transferring data over a system bus between an intelligent controller and a system memory interleave, said computer system comprising:

at least two system buses;

at least two intelligent controllers, at least a first one of the intelligent controllers being connected to a first one of the system buses and at least a second one of the intelligent controllers being connected to a second one of the system buses;

a bus arbiter connected to said system busses for controlling ownership of said busses by said intelligent controllers;

the intelligent controllers including processor means for sending a signal to said arbiter requesting ownership of a selected one of said system busses, said processor means being responsive to an acknowledge signal generated by said arbiter to gain ownership of said selected one of said system busses;

at least two system memory interleaves, each memory interleave being connected to the two system buses;

the intelligent controllers including processor means for sending an interleave lock signal addressed to a selected one of the memory interleaves, the memory interleave selected by an address signal transmitted on the system bus by the intelligent controller's processor means; and the memory interleaves including processor means for detecting the interleave lock signal and responsively allowing the selected one of the memory interleaves to be driven by only the intelligent controller sending the interleave lock signal and denying access to the system bus connected to the sending intelligent controller by any other intelligent controller, to thereby permit transfer of address information and data with integrity between the selected memory interleave and the sending intelligent controller, while allowing the nonselected memory interleave to be driven by the intelligent controller on the system bus not connected to the sending intelligent controller.

* * * * *

UNITED STATES PATENT AND TRADEMARK OFFICE
CERTIFICATE OF CORRECTION

PATENT NO.  : 5,454,082
DATED       : September 26, 1995
INVENTOR(S) : Craig A. Walrath, et al.

It is certified that error appears in the above-indentified patent and that said Letters Patent is hereby corrected as shown below:

On the Title page, item [21] Application No.: 175,157 should be changed to read --975,157--.

Signed and Sealed this

Third Day of September, 1996

*Attest:*

BRUCE LEHMAN

*Attesting Officer*    *Commissioner of Patents and Trademarks*